Dec. 21, 1926.

C. VON ENDE

VALVE FOR SUCTION PUMPS

Filed Nov. 29, 1924

1,611,294

INVENTOR
Carl Von Ende
BY
ATTORNEY

Patented Dec. 21, 1926.

1,611,294

UNITED STATES PATENT OFFICE.

CARL VON ENDE, OF SACRAMENTO, CALIFORNIA.

VALVE FOR SUCTION PUMPS.

Application filed November 29, 1924. Serial No. 752,881.

This invention relates to improvements in suction pump construction and particularly to a valve for use in the suction lines of ordinary suction pumps.

My principal object is to provide a valve for this purpose intended to take the place of the usual flap valve commonly used, and which may be easily installed in the standard valve cage used in connection with such flap valves, by simply removing the latter.

Flap valves are not satisfactory, since dirt and the like can too readily lodge under the same and prevent the proper closing of the valves, and after some use the usual leather hinge provided with such valves becomes worn out and the valve works loose, fails to seat evenly and finally comes off.

My valve overcomes these defects, and being as stated, easily applied to the valve cage as provided with the pump, may be installed without making changes to the main pump structure, and at small cost.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views.

Figure 1:
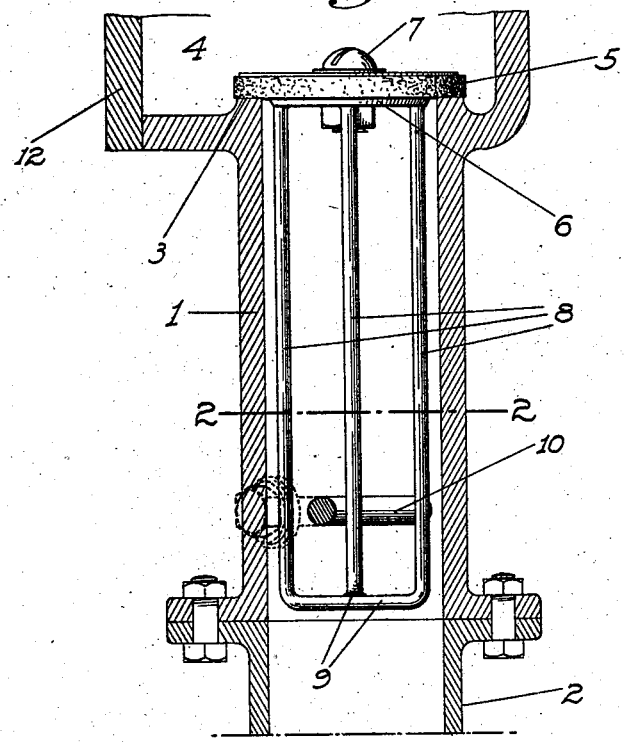
Fig. 1 is a sectional elevation of a suction pump valve cage of ordinary form as commonly used with a flat valve showing my valve mounted therein in place of such flat valve.

Referring now more particularly to the characters of reference on the drawings the numeral 1 denotes a tubular valve cage of common form adapted at its lower end for connection to a suction pipe 2 and having adjacent its upper end a valve-seat flange 3 surrounding the main bore of the cage. The delivery chamber 4 of the cage above and adjacent the horizontal plane of the seat 3 is larger than the suction chamber below the seat as shown, so as to accommodate the usual flap valve which normally rests on the seat 3 but which I remove when I apply my valve. This valve comprises a disc 5 of suitable material, such as leather, which is adapted to rest on the seat 3. Under the disc and smaller than the same is a metal plate 6 to which the disc is removably secured by a bolt 7 or the like.

Figure 2:
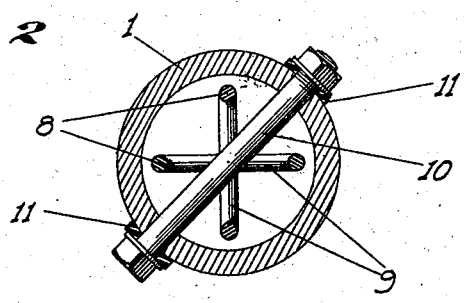
Fig. 2 is a cross section on the line 2—2 of Fig. 1.

This plate not only serves to brace and stiffen the disc, but also serves as supporting means for a plurality of guide rods 8. These rods depend from the plate into the cage and are secured to said plate, and are arranged as two pairs, the plane of one pair being at right angles to the plane of the other pair. The rods of each pair are diametrically opposed to each other and are connected at their lower ends by a cross piece 9 preferably formed integral with said rods. The two cross pieces of the two pairs of rods are arranged one above the other, and are secured together at their intersection by welding or the like, so that a rigid cross in a horizontal plane is formed, as shown in Fig. 2.

To prevent the valve from being dislodged from the cage with the suctional force had with the operation of the pump, and yet allowing the valve to have the necessary upward movement, I place an ordinary bolt 10 diametrically through the cage a said distance above the cross piece 9 when the valve is seated. This bolt of course projects through the space between the different rods 8. To prevent leaking of water from the cage through the bolt orifices, I preferably place washers of rubber 11 or the like between the head and nut of the bolt and the adjacent surfaces of the cage.

The size of the valve disc, the length of the rods and the width between same of course depends upon the corresponding sizes of the cages of the different pumps. Having, however, a correctly proportioned valve for a certain size of cage it will be evident that the valve can be easily mounted in place and removed upon the removal of the usual side plate 12 on the cage above the valve seat.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A valve structure including a tubular valve cage arranged for connection with a suction pipe at its lower end and having a valve seat at its upper end, a valve to seat freely on the seat for movement longitudinally thereof, wires secured to the valve in spaced relation and depending into the cage and being joined at their lower ends the greatest distance between opposed wires being less than the diameter of the cage adjacent the valve seat to allow easy removal of the valve and wire from the cage; and a bolt set through the side walls of the cage and across the cage between the wires to normally prevent such removal, the bolt being removable from outside the cage whereby it can be removed and the valve and wires fished from the cage without disturbing the cage and its connections with the suction pipe.

In testimony whereof I affix my signature.

CARL VON ENDE.